Aug. 22, 1933.    B. H. GUDORF ET AL    1,923,973
AIRCRAFT
Filed July 12, 1932    9 Sheets-Sheet 7
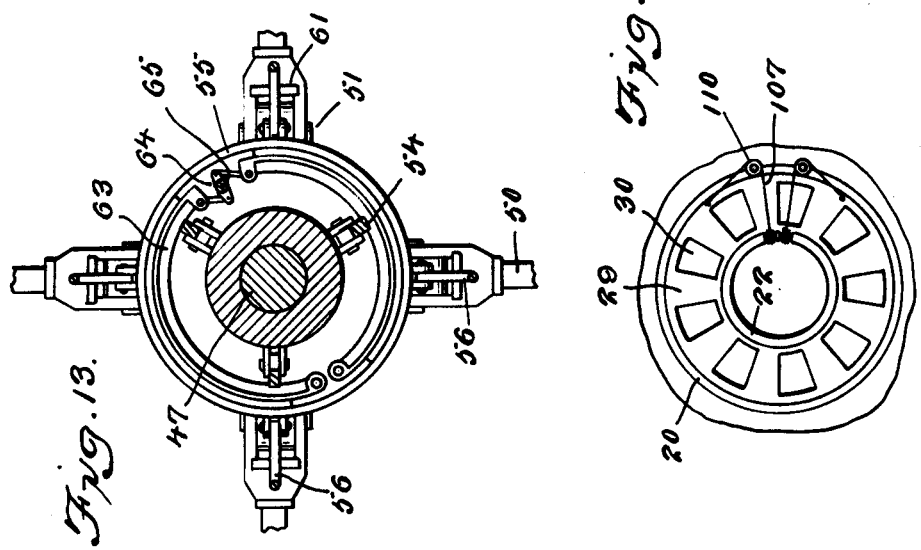
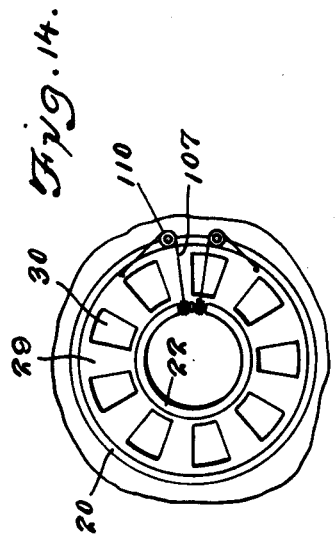
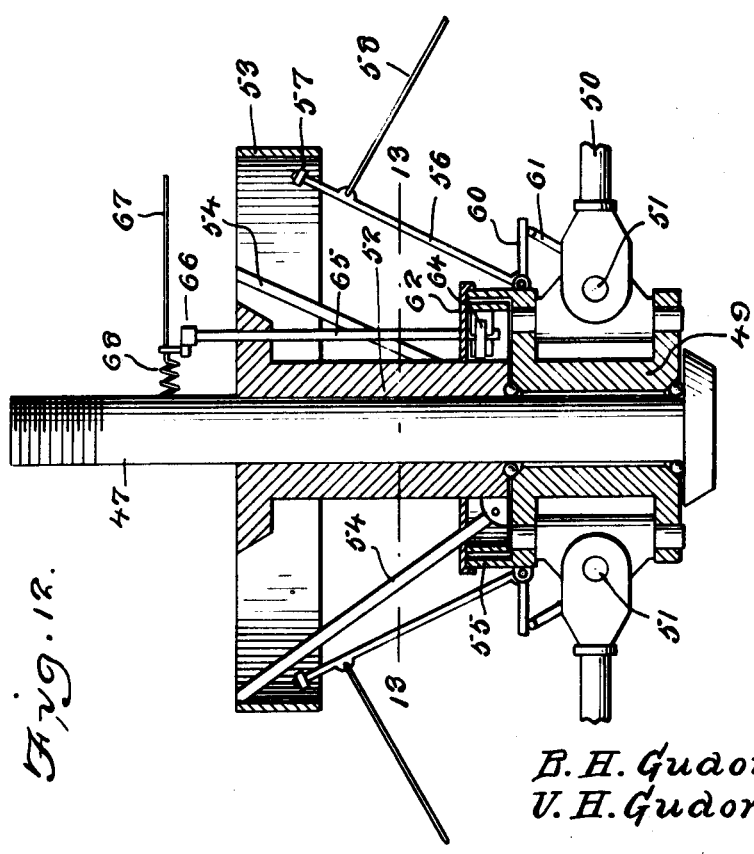
B. H. Gudorf
V. H. Gudorf
INVENTOR
BY Victor J. Evans & Co.
ATTORNEY Aug. 22, 1933.  B. H. GUDORF ET AL  1,923,973
AIRCRAFT
Filed July 12, 1932  9 Sheets-Sheet 8
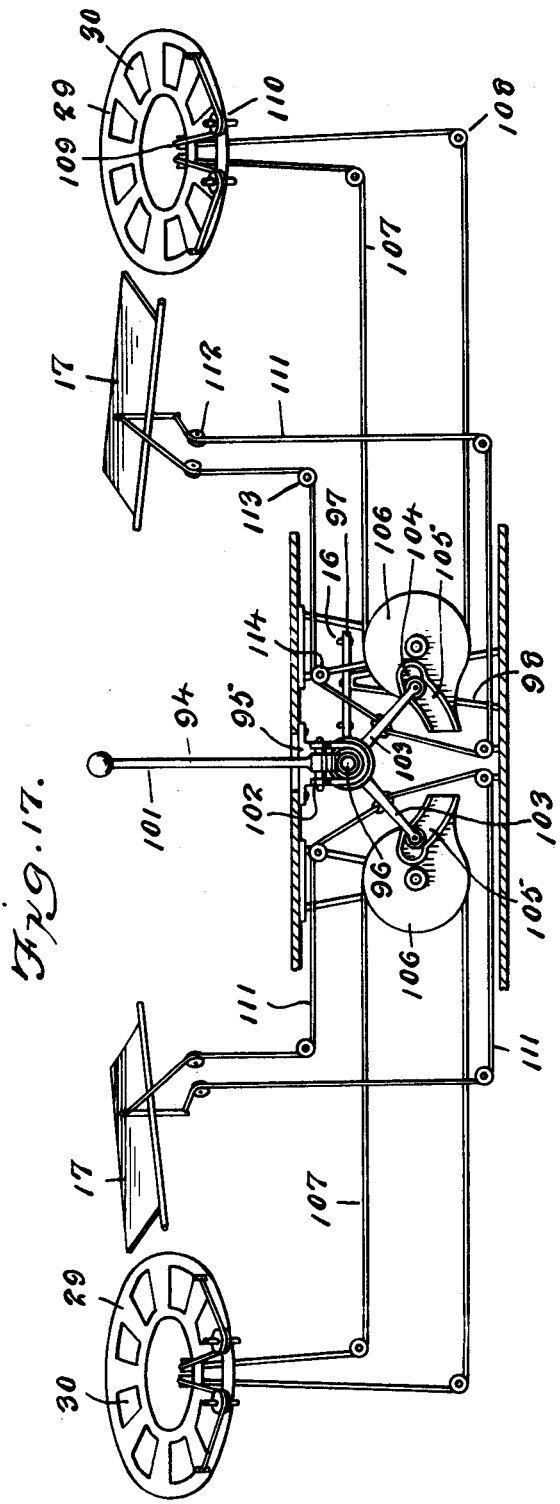
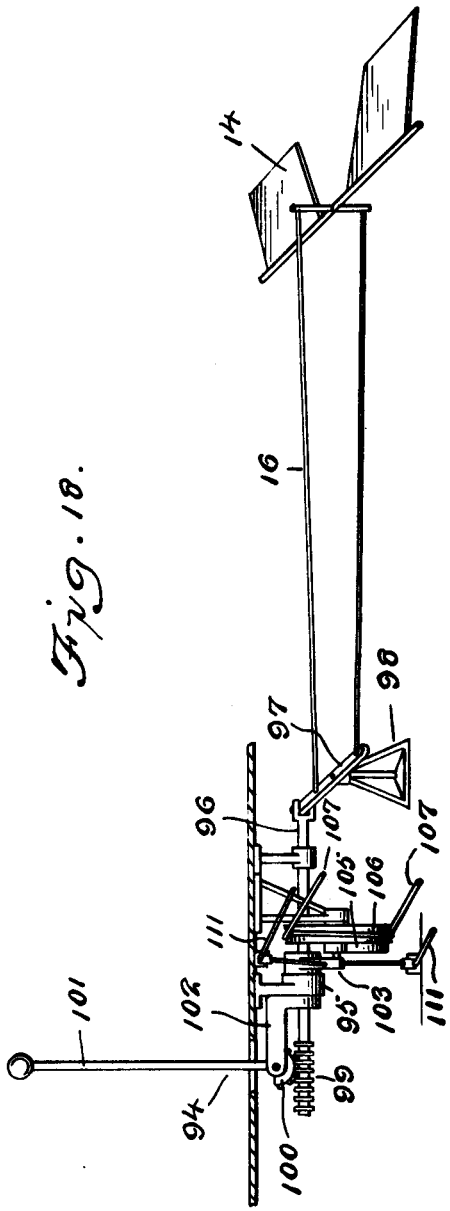
B. H. Gudorf
V. H. Gudorf
INVENTOR
BY Victor J. Evans & Co.
ATTORNEY Aug. 22, 1933.    B. H. GUDORF ET AL    1,923,973
AIRCRAFT
Filed July 12, 1932    9 Sheets-Sheet 9
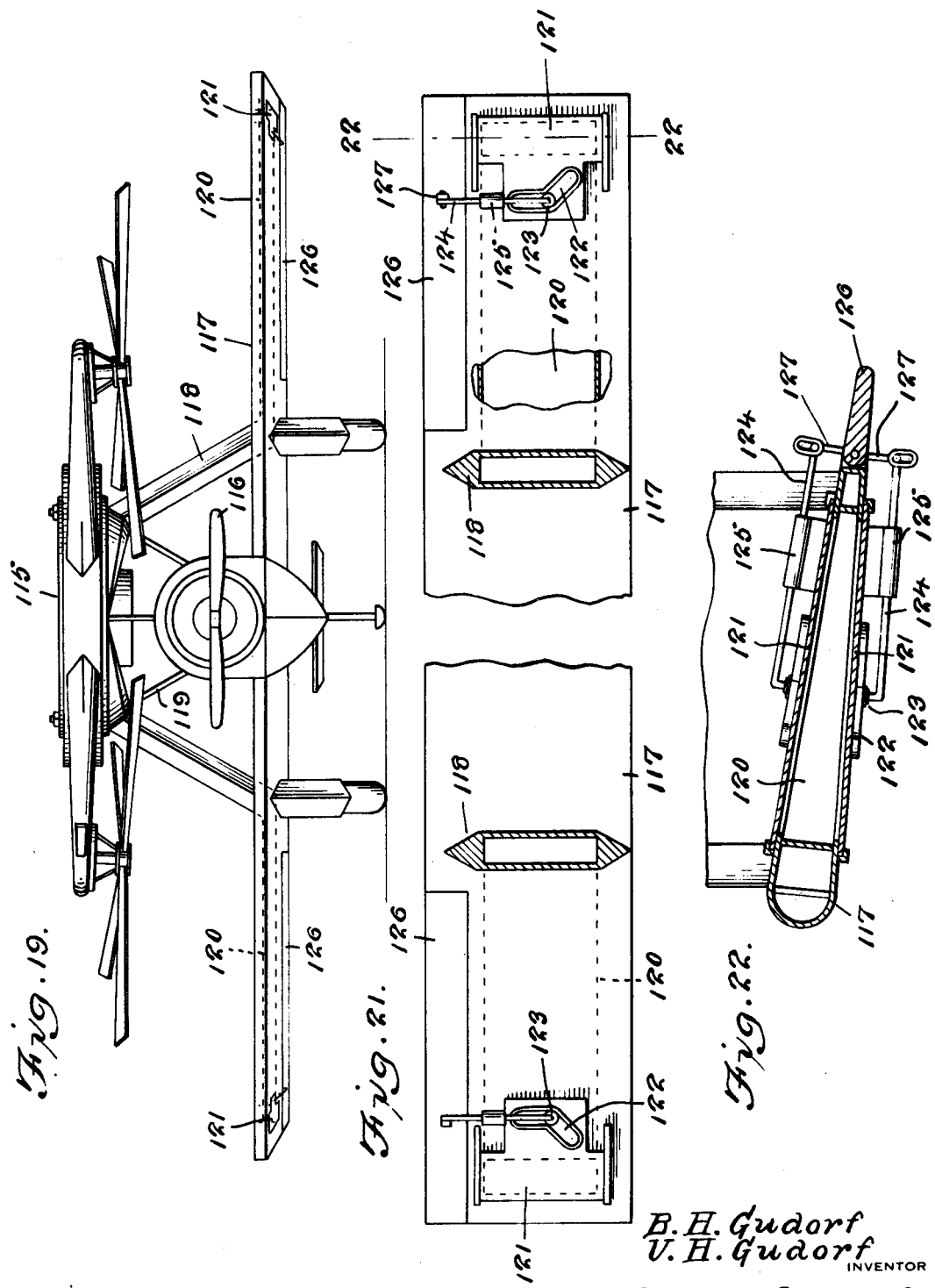
B. H. Gudorf
V. H. Gudorf
INVENTOR
BY Victor J. Evans & Co.
ATTORNEY Patented Aug. 22, 1933

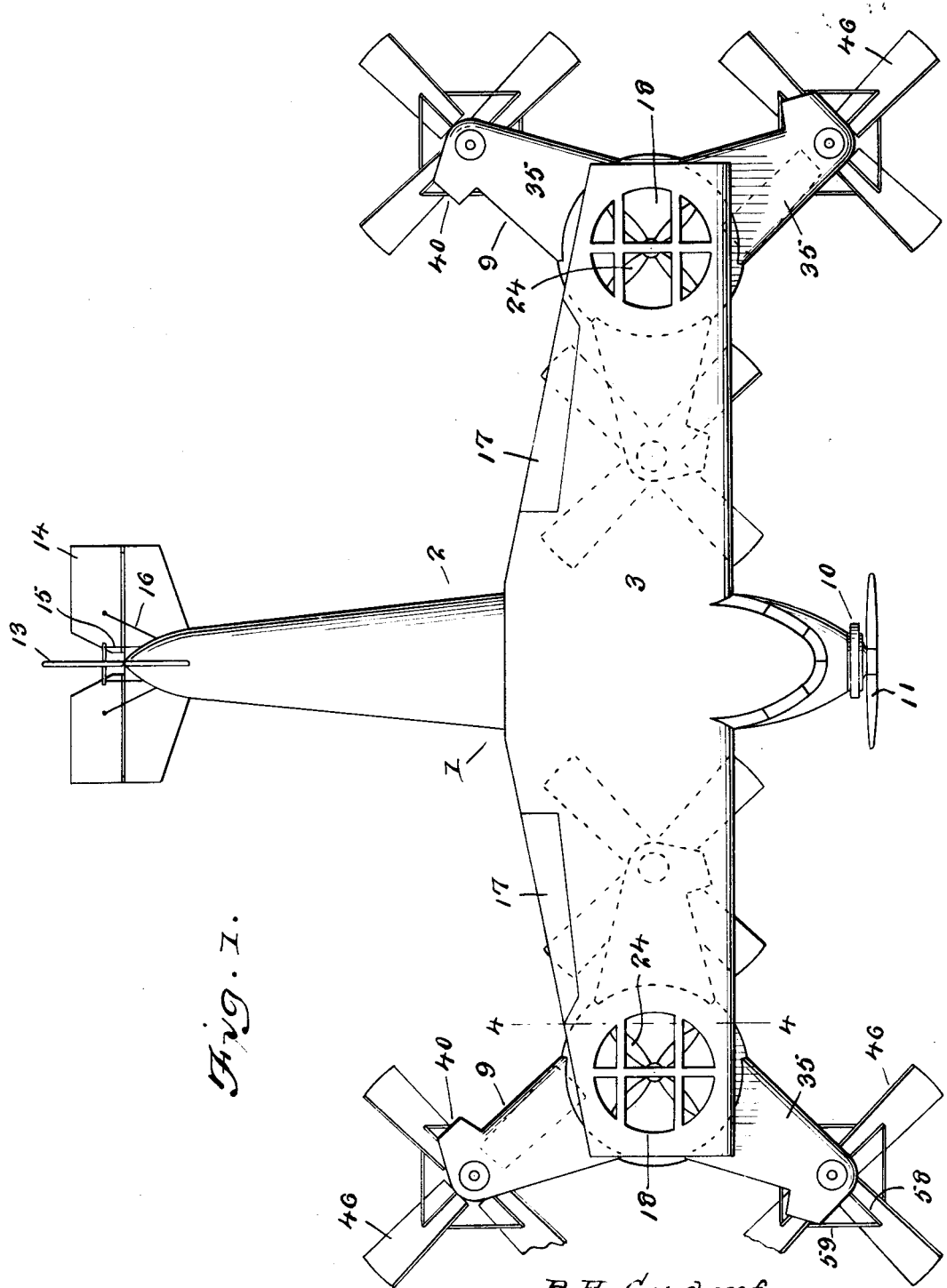

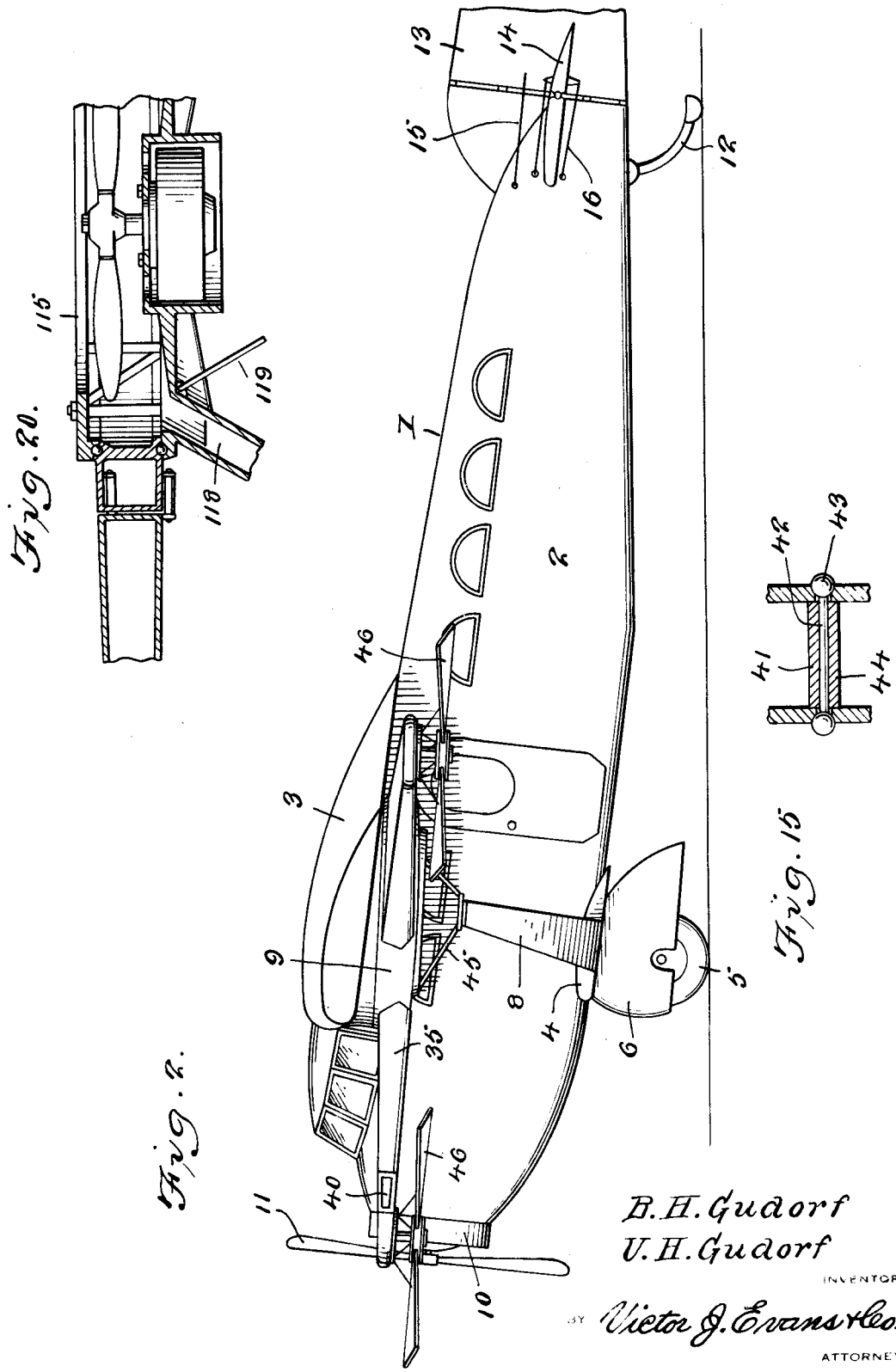

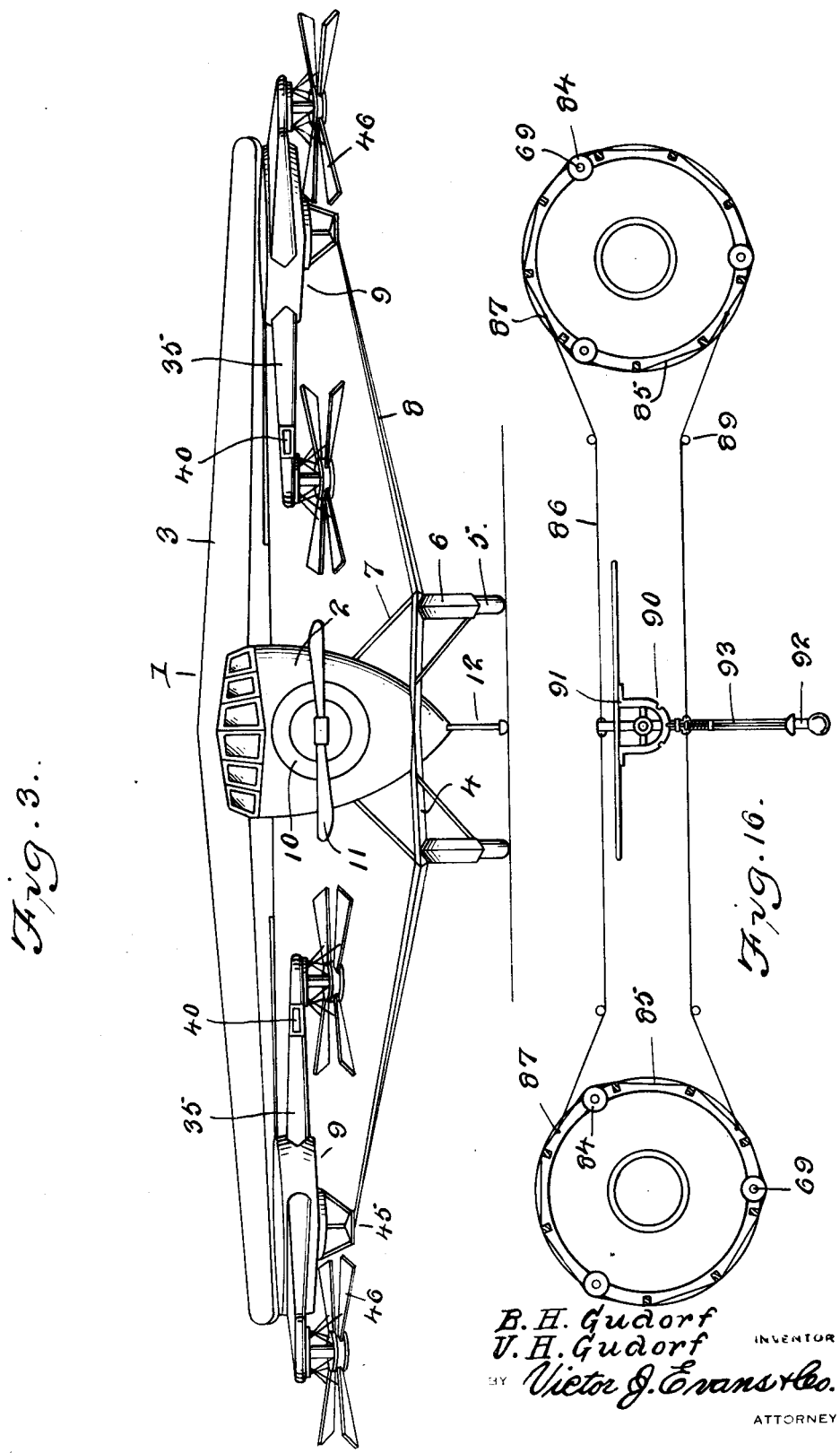

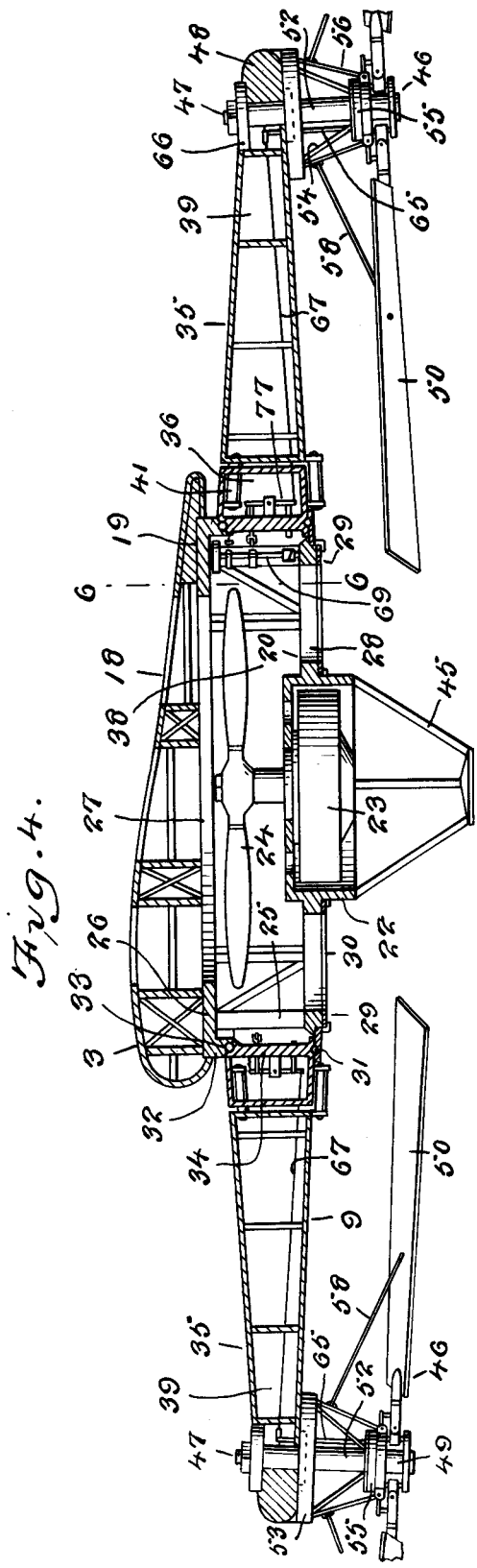
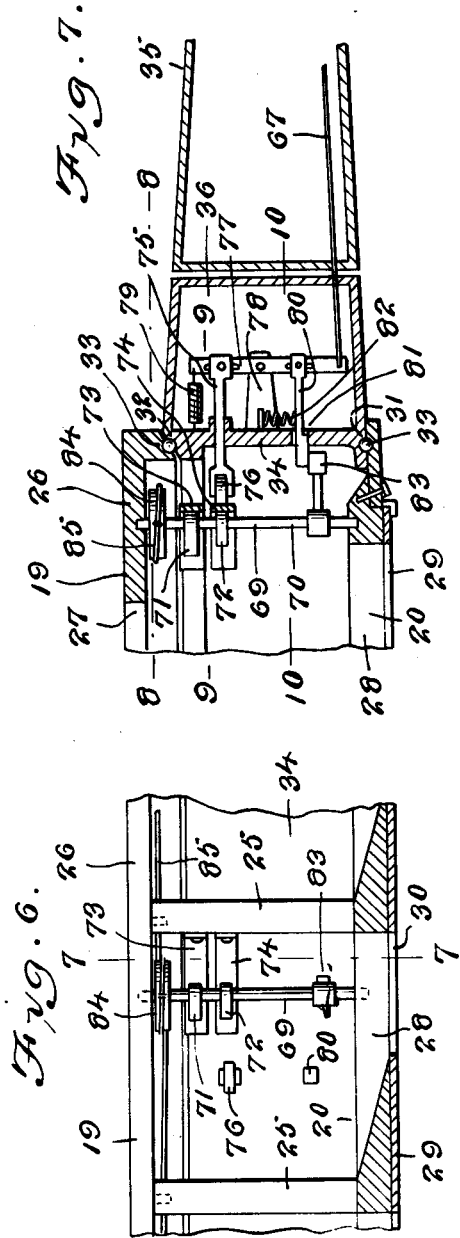

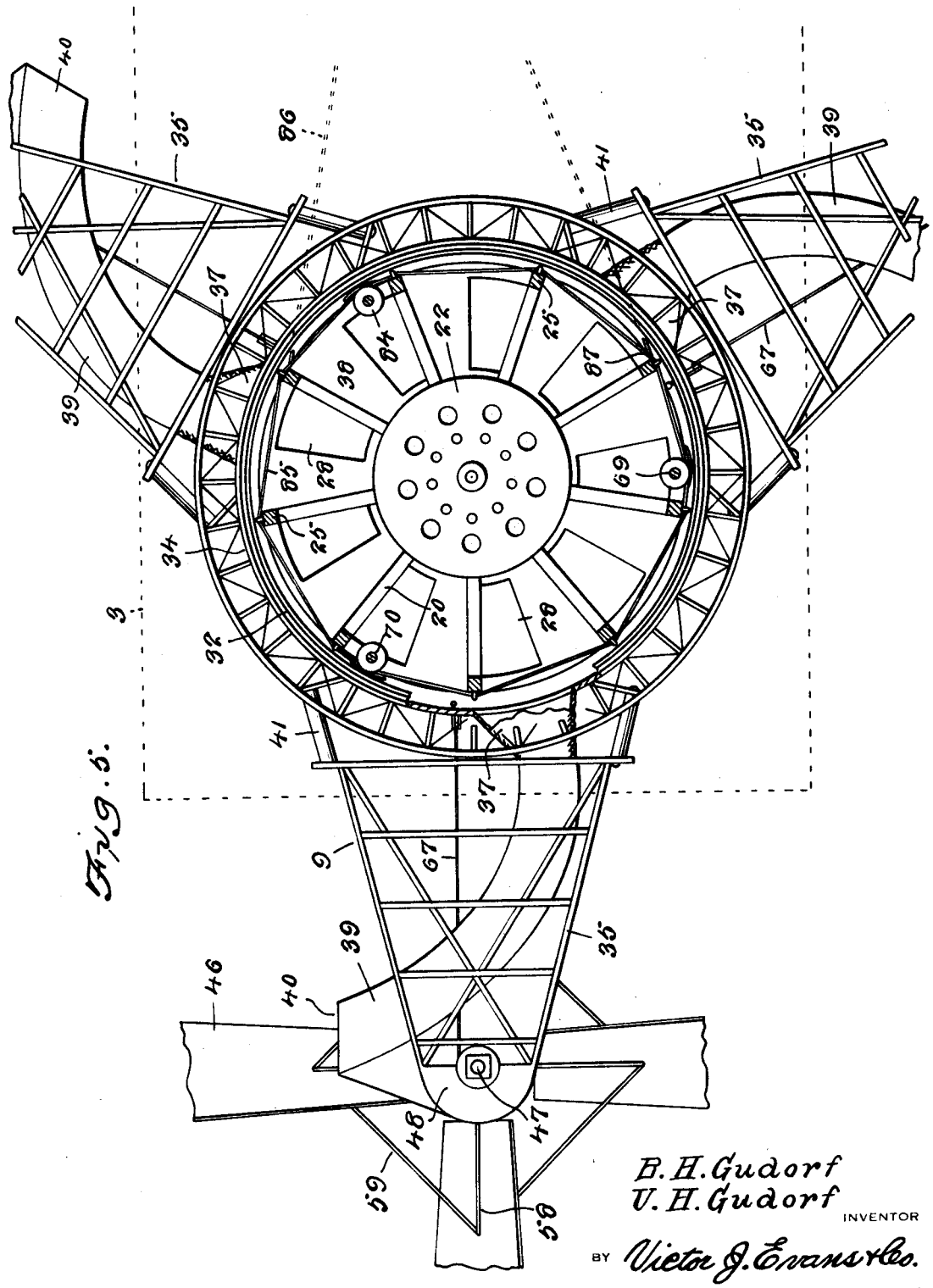

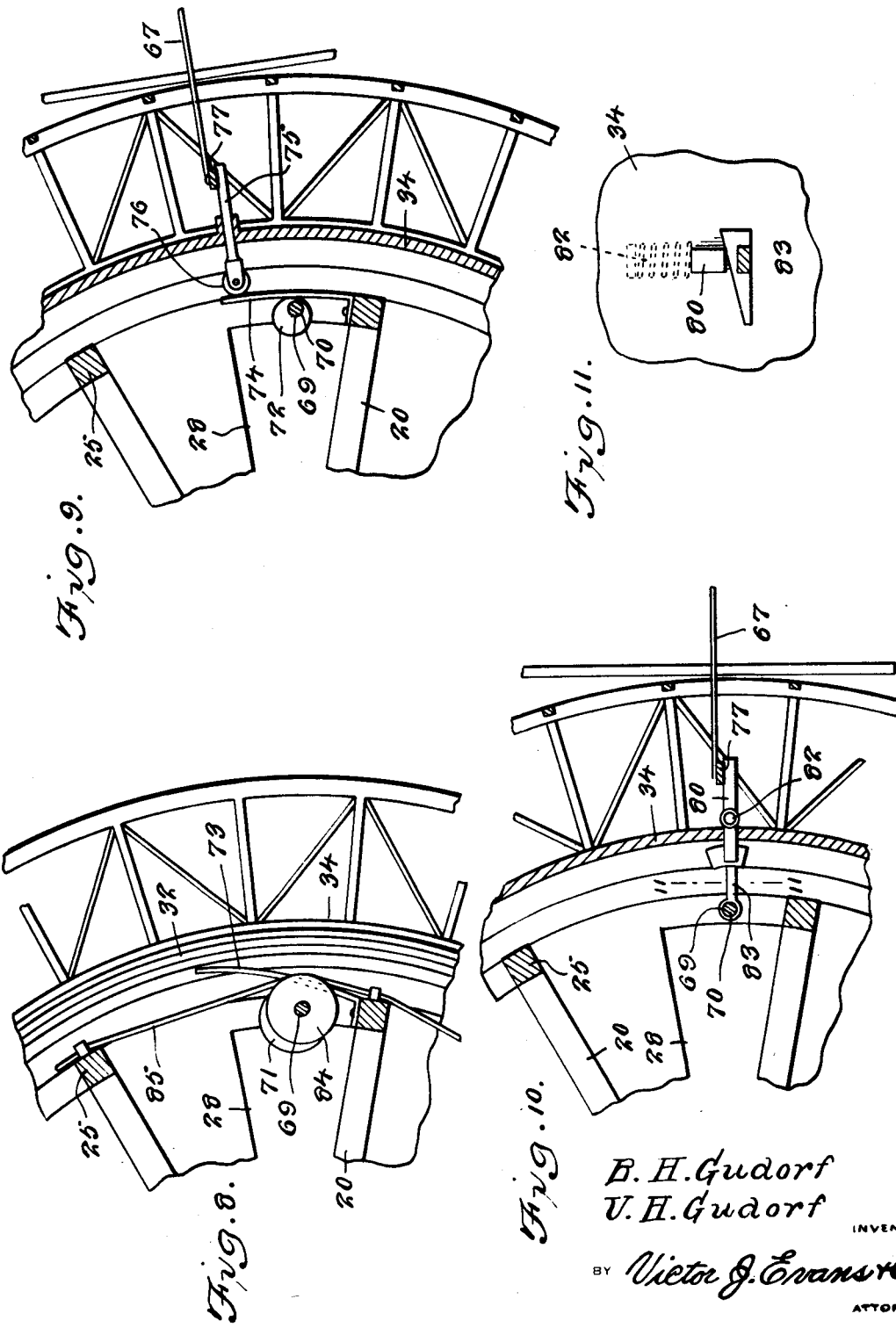

1,923,973

UNITED STATES PATENT OFFICE 1,923,973

AIRCRAFT

Bernard H. Gudorf and Urban H. Gudorf,
Dayton, Ohio

Application July 12, 1932. Serial No. 622,156

19 Claims. (Cl. 244—15)

This invention relates to an aeroplane and has for the primary object, the provision of a combined helicopter and autogiro for causing ascent or descent of the aeroplane vertically and to maintain said aeroplane in flight during non-forward movement thereof and said means being capable of balancing the aeroplane while in flight with a non-forward movement or for cooperating with the usual ailerons in making banks or turns during forward flight of the aeroplane.

Another object of this invention is the provision of means under direct control of the pilot for starting and stopping the operation of the combined helicopter and autogiro.

With these and other objects in view, this invention consists in certain novel features of construction, combination and arrangement of parts to be hereinafter more fully described and claimed.

For a complete understanding of our invention, reference is to be had to the following description and accompanying drawings, in which Figure 1 is a top plan view illustrating an aeroplane constructed in accordance with our invention.

Figure 2 is a side elevation illustrating the same.

Figure 3 is a front elevation illustrating the aeroplane.

Figure 4 is a sectional view taken on the line 4—4 of Figure 1.

Figure 5 is a fragmentary horizontal sectional view illustrating one of the combined helicopters and autogiros.

Figure 6 is a detail sectional view taken on the line 6—6 of Figure 4.

Figure 7 is a detail sectional view taken on the line 7—7 of Figure 6.

Figure 8 is a fragmentary sectional view taken on the line 8—8 of Figure 7.

Figure 9 is a similar view taken on the line 9—9 of Figure 7.

Figure 10 is a similar view taken on the line 10—10 of Figure 7.

Figure 11 is a detail sectional view taken on the line 11—11 of Figure 10.

Figure 12 is an enlarged fragmentary vertical sectional view illustrating the mounting for one of the autogiros.

Figure 13 is a detail sectional view taken on the line 13—13 of Figure 12.

Figure 14 is a fragmentary plan view illustrating a control shutter.

Figure 15 is a detail sectional view illustrating one of the yieldable connections between one of the helicopter wings and its mounting.

Figure 16 is a diagrammatical view showing a control means for the brakes of the helicopter and the autogiro.

Figure 17 is a diagrammatical view showing the control means for the shutters and the ailerons of the aeroplane.

Figure 18 is a diagrammatical view showing the connection of the control means of the ailerons and shutters connected to the elevators.

Figure 19 is a front elevation illustrating an aeroplane in which a single helicopter and autogiro are applied thereto and disposed above the wing.

Figure 20 is a fragmentary sectional view illustrating the mounting for the helicopter and autogiro employed in our modified form of invention.

Figure 21 is a plan view partly in section illustrating the wing of the aeroplane.

Figure 22 is a sectional view taken on the line 22—22 of Figure 21.

Referring in detail to the drawings, the numeral 1 indicates an aeroplane including a fuselage 2 carrying a main wing 3 and a comparatively small wing 4 disposed thereunder to which is attached the landing gear 5 partially enclosed by housings 6 of stream lines. The wing 4 is strengthened by struts 7 between itself and the fuselage and also has attached thereto struts 8 inclining upwardly and outwardly to the combined helicopter and autogiro 9 located at each end of the main wing 3. The forward end of the fuselage carries an engine 10 for driving a traction propeller 11. It being understood that the rotation of the propeller 11 causes the aeroplane to travel in a forward direction. The rear end of the fuselage carries a tail-skid 12, a rudder 13, and elevators 14. The rudder 13 has control cables 15 connected thereto while the elevators have control cables 16 connected thereto. The main wing 3 is provided with ailerons 17. The foregoing description relates to a well known description of aeroplane to which our invention is adaptable.

The main wing 3 adjacent its ends is provided with openings 18 therethrough and are communicative with mountings 19 of the combined helicopters and autogiros 9 and which helicopters and autogiros and their mountings 19 are identical in construction and reference to one is thought sufficient for both.

The mounting 19 consists of a frame 20 of annular formation carrying centrally thereof an engine mounting 22 in which is mounted an engine 23 for driving a propeller 24 located within the mounting 19 directly under the opening 18 of the main wing 3 for the purpose of drawing air downwardly through the wing into the mounting. Upstanding posts 25 are carried by the frame 20 and are secured to an annular plate 26 suitably secured to the under face of the wing and provided with an opening 27 alining with the opening 18 in the wing. The frame 20 forms therein a plurality of openings 28 controllable by a shutter 29 rotatably mounted on the under face of the frame. The shutter 29 is provided with a series of openings 30 movable into and out of registration with the openings 28 for controlling the escape of air from the mounting 19 drawn in by the rotation of the propeller 24. The frame 20 and the plate 26 have formed thereon bearing flanges 31 and 32 grooved to receive ball bearings 33 which rotatably support on the mounting 19 an annular member 34 having extending radially therefrom helicopter wings 35. The annular member 34 has formed therein an annular chamber 36 in which is located at spaced intervals funnel shaped pipes or tubes 37 communicative with the interior of the chamber 38 located within the mounting 19 and in which the propeller 24 rotates while the opposite ends are flexibly connected to driving tubes 39 located in and carried by the wings 35 and have exhaust ends 40 disposed angularly. The drive tubes 39 are curved or of arcuate formation as shown in Figure 5 so that the air passing through the tubes from the chamber 38 under the influence of the propeller 24 will cause rotation of the wings 35 about the mounting 19. The wings 35 are shaped to cause a vertical lifting action while in rotation upon the main wing 3.
Couplings 41 are provided between the wings 35 and the annular member 34 so that said wings will have a limited flexation relative to the annular member 34. Each coupling 41 consists of a rod 42 having heads 43 of spherical shape on the ends thereof fitting in concave seats formed in portions of the annular member 34 and the wings 35. A tubular sleeve 44 surrounds the rod 42 between a portion of the wing 35 and the annular member 34 and is preferably constructed of rubber or any other yieldable material so that the wing 35 may flex a limited amount relative to the annular member 34.

Converging braces 45 depend from the engine mounting 22 of the frame 20 and are connected to the outer ends of the struts 8.

Each helicopter wing 35 carries an autogiro 46 and which autogiro 46 consists of a vertical shaft 47 secured to a plate 48 carried by the end of the wing 35. A hub 49 is journalled on the shaft 47 with thrust and anti-friction bearings and has connected thereto autogiro blades 50 by universal joints 51. The blades 50 are capable of limited movement relative to the hub 49 and are arranged at a desired pitch to be acted upon by air currents causing rotation of the blades about the shaft 47 and producing a lifting effect to the helicopter wing 35. A spacing sleeve 52 is interposed between the wing 35 and the hub 49 and surrounds the shaft 47. An annular member 53 surrounds the upper end of the sleeve 52 and is arranged in close proximity to the under face of the wing 35 and is supported by struts 54 connected to the lower end of the sleeve 52. A brake drum 55 is carried by the hub 49 and surrounds the lower end of the sleeve 52 and has pivoted thereto levers 56 that extend upwardly within the annular member 53 and are provided with rollers 57 for engagement with the annular member 53. Each lever 56 is connected to a blade 50 by a cable 58 and the blades 50 are connected with each other by cables 59. The cables 59 have sufficient slack therein to permit the blades to have a limited relative movement toward and from each other. The pivoted ends of the levers 56 carry ears 60 engaged by projections 61 carried by the universal joints 51. Each projection 61 is carried by the section of the universal joint which is connected to the blade so that during non-rotation of the blades the rollers 57 of the levers 56 will be brought into contact with the annular member 53 for limiting the downward movement of said blades. The blades during rotation are adapted to maintain a substantially horizontal position due to centrifugal force which brings the projections 61 in engagement with the ears 60 and swings the levers 56 on their pivots to disengage the rollers 57 thereof from engagement with the annular member 53.
The lower end of the sleeve 52 carries a closure plate 62 overlying the brake drum 55 on the hub 49 and has mounted thereon brake shoes 63 movable into and out of engagement with the brake drum 55 by an eccentric 64 carried by the lower end of an operating rod 65. The operating rod 65 is suitably supported for rotation and has secured to its upper end an arm 66 to which an operating cable 67 is connected. A spring 68 is also connected to the arm 66 for turning the rod 65 in one direction for the purpose of disengaging the brake shoes 63 from the brake drum 55. The upper end of the rod 65 is disposed within its respective wing 35 with the cable 67 thereof extending through said wing to an operating medium 69. There being an operating medium 69 for each helicopter wing 35 and its respective autogiro 46 and each includes a shaft 70 journalled to the frame 20 and plate 26 and has secured thereto eccentrics 71 and 72 for actuating flexible elements 73 and 74. The flexible elements 73 and 74 are carried by the non-rotatable part of the mounting 19 and the flexible element 73 is adapted to act as a brake when flexed by its respective eccentric 71 and brought into engagement with the annular member 34 for retarding or stopping the rotation thereof, while the flexible element 74 when flexed by its respective eccentric 72 is adapted to strike and cause a sliding movement of a plunger 75 carried by the annular member 34. One end of the plunger 75 is provided with a roller 76 to engage the flexible element 74 while the other end of the plunger is pivotally and slidably connected to a lever 77 pivoted to a bracket 78 within the chamber 37 of the annular member 34. The cable 67 of the brake to the autogiro 46 is connected to one end of the lever 47, while the other end is connected to a tension spring 79 for urging the plunger inwardly and the end of the lever 77 to which the cable 67 is connected outwardly for releasing the brake of the autogiro. The brake being applied by outward sliding movement of the plunger 75 striking the flexible element 74 when flexed by its eccentric 72. A catch 80 is pivotally and slidably connected to the lever 77 adjacent the cable 67 and is slidable through an opening 81 in the wall of the annular member 34 and when moved inwardly is adapted to drop against the inner wall of the annular member and hold the brake of the autogiro 46 applied. A spring 82 urges the catch 80 into locking position. An arm 83 is carried by the shaft 70 and when shaft is rotated to release the brakes the catch 80 is moved upwardly to free the catch and allow the lever 77 to swing on its pivot under the influence of the spring 79 to release the brake of the autogiro 46.

The upper ends of the shafts 70 have pulleys 84 secured thereto and an endless cable 85 is passed about said pulleys with the cable wrapped one or more times about each pulley and secured thereto. Brake operating cables 86 are secured to the endless cables 85 as shown at 87 and pass over guide pulleys 89 to a control device 90 located in the cabin of the fuselage 2. The control device 90 consists of a rack 91 suitably mounted in the fuselage and having a control lever 92 pivoted thereto and to which the cables 86 are connected as shown in Figure 16. A spring pressed locking device 93 is carried by the control lever 92 to engage the rack 91 for holding the lever either in a position to apply the brakes or to release the brakes. Thus it will be seen that the pilot in making a landing can stop the operation of the combined helicopter and autogiro by applying the brakes through the movement of the control lever 92 in the desired direction. It will also be understood that the engines 23 are controllable by the pilot within the cabin of the fuselage and that the engines are fed with fuel from suitable reservoirs (not shown) mounted in the main wing 3.

A control device 94 is located in the cabin of the fuselage 2 and consists of a hanger 95 suitably mounted and slidably supports a shaft 96, one end of which is pivoted to a lever 97 pivotally mounted on a perch 98, and said lever is connected to the cables 16 of the elevators 14. The other end of the shaft 96 is provided with spaced rings 99 engageable by teeth of a segmental rack 100 carried by a control or joy stick 101. A bracket 102 pivotally supports the joy stick 101 for a forward and rearward motion for the purpose of imparting to the shaft 96 corresponding movements to actuate the elevators. The bracket 102 is rotatably supported by one of the hangers which slidably supports the shaft 96 so that the joy stick 101 may be swung laterally in either direction. The bracket 102 carries diverging arms 103 provided at their free ends with rollers 104 engageable with curved tracks 105 formed on drums 106. The drums 106 have trained thereover cables 107. The cables 107 pass over guide pulleys 108, 109 and 110 and have their ends fastened to the movable shutters 29. Each aileron has cables 111 connected thereto which pass over guide pulleys 112, 113 and 114 and are secured to their respective arm 103 so that the ailerons will be actuated by the lateral movement of the joy stick 101, and the lateral movement of the joy stick in one direction causes rotation of one of the shutters while the other shutter remains stationary. This being accomplished by the curved tracks 105 on the drums 106. When the joy stick is moved laterally to raise one aileron and also lower the other aileron, the shutter 30 on the end of the wing 3 to which the aileron is lowered is caused to rotate to move the openings 30 thereof into registration with the openings 28 of the respective frame 20 permitting the air drawn in the respective chamber 38 by the propeller 24 passing outwardly therefrom in a downward direction. The downward movement of the air against the atmosphere cooperating with the downwardly tilted aileron will cause the desired end of the wing to raise, while the other end of the wing which is desired to be lowered, has its respective aileron tilted upwardly while its respective shutter remains in a normally closed position. The normal position of the shutters is to close the openings 28 of the frame. It will therefore be seen that the shutters cooperate with the ailerons in aiding in balancing the aeroplane when in flight within the air. This will permit the aeroplane to remain substantially stationary when the engines 23 are operating to drive the propellers 24. The air currents drawn in by the propellers 24 cause rotation of the wings 35 due to the air passing through the drive tubes 39 and the rotation of the wings 35 cause rotation of the blades 50. The blades 50 cooperating with the wings 35 in maintaining the aeroplane in the air when in non-forward motion. The engine 10 and propeller 11 being employed to cause a forward motion of the aeroplane. The balancing of the rear end of the aeroplane being accomplished by the elevators 14 being acted upon by the air currents created by the propeller 11.

An aeroplane equipped with a device constructed in accordance with our invention will permit vertical ascent and descent of the aeroplane over a given location and also at the will of the pilot the aeroplane may be maintained in the air with a non-forward movement thereof by keeping the engines 23 operating and when desiring a forward motion, the pilot speeds up the engine 10. When the aeroplane is in the air and in non-forward motion, the pilot keeps the engine 10 idling or running at a speed only sufficient to cause the propeller 11 to create sufficient air currents for action upon the elevators 14. When descending in a vertical direction with the device, the engines are slowed down and as the running gear 5 contacts with the ground along with the tail skid 12, the brakes to the combined helicopters and autogiros are applied through the control lever 92 allowing the aeroplane to rest upon the ground with safety.

Referring to our modified form of invention as shown in Figures 19 to 22 inclusive, an aeroplane of the monoplane type is disclosed having a combined helicopter and autogiro 115 mounted above the fuselage 116 and the wing 117 thereof. The unit 115 is constructed similarly to one of the combined helicopters and autogiros 9 employed in our preferred form of invention and the unit is supported by struts 118 and 119, the struts 119 being connected to the fuselage 116 while the struts 118 are of hollow formation and connected to the wing 117 and the latter has formed therein chambers 120 which open outwardly through the upper and lower faces thereof adjacent the ends of the wing and are controlled by slidable gates 121 provided with curved tracks 122 engaged by rollers 123 carried by slidable rods 124 mounted in brackets 125 carried by the wing 117. Ailerons 126 are pivotally connected to the wing 117 and have secured thereto arms 127 pivotally and slidably connected to the plungers whereby the actuation of the ailerons in the usual manner will impart movements to the gates. The normal position of the gates is to close the chambers 120 at the ends of the wing and when the ailerons 126 are tilted upwardly, the upper gates are moved into open position, while the lower gates remain closed and when the ailerons are tilted downwardly, the lower gates are opened and the upper gates remain closed. It being understood that the ailerons are controlled from the cock pit of the fuselage in the usual manner. The air drawn in by the propeller of the unit 115 is driven downwardly through the hollow struts 118 into the chambers 120. Some of the air drawn in by the propeller of the unit 115 exhausts directly downwardly by the mounting for the engine of said propeller. The engine of the unit 115 in operation to drive the propeller thereof will cause an operation of the unit 115 in accordance with the operation of one of the units 9 heretofore described so that the aeroplane may be caused to ascend and descend vertically at the will of the operator and to maintain the areoplane within the air during non-forward movement thereof. The shutter arrangement heretofore described is omitted from the unit 115.

To balance the aeroplane while in flight or when desiring to tilt one end of the wing and elevate the other end thereof as when making a turn or bank with the aeroplane, the aileron on the end of the wing which is desired to be elevated is lowered or tilted downwardly, while the other aileron is tilted upwardly. The end of the wing which is to be elevated by the downward tilting of its respective aileron, causes the lower gate of that end of the wing to open, while the upper gate remains closed permitting the air to exhaust downwardly from the respective chamber 120 against the atmosphere cooperating with the downwardly tilted aileron to raise the desired end of the wing while the other end of the wing which is desired to be lowered, has its respective aileron tilted upwardly and the upper gate thereof is opened while the lower gate remains closed, thus it will be seen that the air escaping from the chambers of the wings is such that it will cooperate with the ailerons in bringing about the balancing or banking of the aeroplane as desired by the pilot.

In either form of our invention some of the air drawn in by the propellers of the unit 9 or 115 will exhaust about the engines of the device for the purpose of cooling said engines. It is also to be understood that the aeroplane in our modified form of invention employs the usual engine at the front end of the fuselage and propeller therefor for the purpose of causing forward motion of the aeroplane.

While we have shown and described the preferred embodiment of our invention, it will be understood that minor changes in construction, combination and arrangement of parts may be made without departing from the spirit and scope of our invention, as claimed.

Having thus described our invention, what we claim is:

1. In combination with an aeroplane having means for causing forward flight thereof, a helicopter carried by said aeroplane, and an autogiro carried by said helicopter for cooperating with the latter in mantaining the aeroplane in the air during non-forward movement thereof and to cause ascent and descent of the aeroplane vertically.

2. In combination with an aeroplane having means for causing forward flight thereof, a helicopter carried by said aeroplane, power actuated pneumatic means for actuating the helicopter, and an autogiro carried by and actuated by the movement of the helicopter for cooperating with the latter to maintain the aeroplane in the air during non-forward movement thereof and to cause ascent and descent of the aeroplane vertically.

3. In combination with an aeroplane having means for causing forward flight thereof, a helicopter carried by said aeroplane, power actuated pneumatic means for actuating the helicopter, an autogiro carried by and actuated by the movement of the helicopter for cooperating with the latter to mantain the aeroplane in the air during non-forward movement thereof and to cause ascent and descent of the aeroplane vertically, and means for simultaneously stopping the operation of the helicopter and the autogiro.

4. In combination with an aeroplane having a means for causing forward flight thereof, a mounting carried by the aeroplane, helicopter wings rotatably supported by said mounting, power driven pneumatic means for rotating said wings, and an autogiro carried by each wing and operated by the movement of the respective wing.

5. In an aeroplane, mountings carried by the aeroplane and located adjacent the ends of the wings of the aeroplane and connected to said wing, helicopter wings rotatably supported by said mounting and extending radially therefrom, an autogiro carried by each of said helicopter wings, and power driven pneumatic means for rotating the helicopter wings.

6. In an aeroplane, mountings carried by the aeroplane and located adjacent the ends of the wings of the aeroplane and connected to said wing, helicopter wings rotatably supported by said mounting and extending radially therefrom, an autogiro carried by each of said helicopter wings, power driven pneumatic means for rotating the helicopter wings, and braking means for retarding the movement of the helicopter wings and the autogiros carried thereby.

7. In an aeroplane, mountings carried by the wing of an aeroplane and having chambers therein, helicopter wings rotatably supported by said mountings, power driven means in said mountings for drawing air into the chambers, means carried by the helicopter wings to receive air from the chambers to cause rotation of said helicopter wings, and an autogiro rotatably supported and movable with each of said helicopter wings.

8. In an aeroplane, mountings carried by the wing of an aeroplane and having chambers therein, helicopter wings rotatably supported by said mountings, power driven means in said mountings for drawing air into the chambers, means carried by the helicopter wings to receive air from the chambers to cause rotation of said helicopter wings, an autogiro rotatably supported and movable with each of said helicopter wings, and means for opening and closing the chambers for controlling the exhaust of air therefrom.

9. In an aeroplane, mountings carried by the wing of the aeroplane and having chambers therein, helicopter wings rotatably supported by said mountings, power driven means in said mountings for drawing air into the chambers, means carried by the helicopter wings to receive air from the chambers to cause rotation of said helicopter wings, an autogiro rotatably supported and movable with each of said helicopter wings, and means operable by the controls of the aeroplane for opening and closing the chambers to permit the escape of air therefrom and to retard the escape of air from said chambers for aiding in balancing the aeroplane.

10. A device for aeroplanes comprising a mounting having a chamber, radially extending helicopter wings journalled to said mounting, means for forcing air into the chamber, means carried by said wings and in communication with the chamber to receive air therefrom for causing rotation of the wings, and a shutter arrangement for controlling the escape of air from the chamber.

11. A device for aeroplanes comprising a mounting having a chamber, radially extending helicopter wings journalled to said mounting, means for forcing air into the chamber, means carried by said wings and in communication with the chamber to receive air therefrom for causing rotation of the wings, and autogiro blades rotatably mounted on each of said wings and actuated by the movements of the latter.

12. A device for aeroplanes comprising a mounting, radially extending helicopter wings carried by said mounting for rotation thereabout, power driven pneumatic means for causing rotation of the wings, a shaft carried by each of said wings, and a plurality of blades journalled on each shaft to form an autogiro for each wing.

13. A device for aeroplanes comprising a mounting, radially extending helicopter wings carried by said mounting for rotation thereabout, power driven pneumatic means for causing rotation of the wings, a shaft carried by each of said wings, a hub journalled on each shaft, and autogiro blades universally connected to each hub and adapted to assume operative position by centrifugal action.

14. A device for aeroplanes comprising a mounting, radially extending helicopter wings carried by said mounting for rotation thereabout, power driven pneumatic means for causing rotation of the wings, a shaft carried by each of said wings, a hub journalled on each shaft, autogiro blades universally connected to each hub and adapted to assume operative position by centrifugal action, and means for limiting downward movement of the blades when in non-rotation.

15. A device for aeroplanes comprising a mounting, radially extending helicopter wings carried by said mounting for rotation thereabout, power driven pneumatic means for causing rotation of the wings, a shaft carried by each of said wings, a hub journalled on each shaft, autogiro blades universally connected to each hub and adapted to assume operative position by centrifugal action, means for limiting downward movement of the blades when in non-rotation, a brake for each hub, a second brake for controlling the movement of the wings, and a control means for effecting operation of the brakes simultaneously.

16. In combination with an aeroplane wing having openings therethrough adjacent the ends of said wings, ailerons carried by the wings, mountings carried by the wing and having chambers in communication with the openings to receive air by way of said openings, shutters for controlling air from said chambers, power driven means carried by the mountings for drawing air into the chambers, helicopter wings journalled on said mountings and rotated by air received from the chambers, an autogiro for each helicopter wing, and a control means for effecting movement of the shutters and ailerons.

17. In combination with an aeroplane wing having openings therethrough adjacent the ends of said wings, ailerons carried by the wings, mountings carried by the wings and having chambers in communication with the openings to receive air by way of said openings, shutters for controlling air from said chambers, power driven means carried by the mountings for drawing air into the chambers, helicopter wings journalled on said mountings and rotated by air received from the chambers, an autogiro for each helicopter wing, said shutters normally occupying a closed position, and a control means for the ailerons and the shutters and adapted to effect opening of the shutters only when tilting the ailerons downwardly, and to permit the shutters to remain closed when the ailerons are tilted upwardly.

18. In combination with an aeroplane wing having openings therethrough adjacent the ends of said wings, ailerons carried by the wings, mountings carried by the wings and having chambers in communication with the openings to receive air by way of said openings, shutters for controlling air from said chambers, power driven means carried by the mountings for drawing air into the chambers, helicopter wings journalled on said mountings and rotated by air received from the chambers, an autogiro for each helicopter wing, said shutters normally occupying a closed position, a control for effecting operation of the ailerons in opposite directions, and means between the shutters and the control for opening said shutters during the downward tilting of the ailerons by the control and permitting said shutters to remain closed during the upward tilting of the ailerons by said control.

19. In combination with an aeroplane having a wing provided with chambers adjacent each end and opening outwardly through the upper and lower surfaces of the wing and ailerons carried by the wing, gates normally closing the chambers, means between the gates and the ailerons for opening the gates on the upward tilting of said ailerons and adapted to permit the gates to remain closed on the downward tilting of the ailerons, a combined helicopter and autogiro unit carried by the aeroplane, a power driven pneumatic means in said unit for causing rotation thereof, and means conveying air from said pneumatic means to the chambers.

BERNARD H. GUDORF.
URBAN H. GUDORF.